(12) United States Patent
Carlson

(10) Patent No.: US 7,314,991 B2
(45) Date of Patent: Jan. 1, 2008

(54) METHOD OF CONVEYING MUSICAL INFORMATION

(76) Inventor: Patricia Carlson, P.O. Box 1198, South Fork, CO (US) 81154

(*) Notice: Subject to any disclaimer, the term of this patent is extended or adjusted under 35 U.S.C. 154(b) by 90 days.

(21) Appl. No.: 11/445,622

(22) Filed: Jun. 2, 2006

(65) Prior Publication Data

US 2007/0000373 A1  Jan. 4, 2007

Related U.S. Application Data

(63) Continuation-in-part of application No. 10/727,368, filed on Dec. 4, 2003, now abandoned.

(60) Provisional application No. 60/431,111, filed on Dec. 5, 2002.

(51) Int. Cl.
*G09B 15/02* (2006.01)

(52) U.S. Cl. ............... 84/483.2; 84/485 R; 84/478

(58) Field of Classification Search ............ 84/478, 84/479 R, 483.1, 483.2, 485 R, 485 S
See application file for complete search history.

(56) References Cited

U.S. PATENT DOCUMENTS

| | | | | |
|---|---|---|---|---|
| 706,002 | A * | 8/1902 | Allen | 400/487 |
| 1,053,366 | A * | 2/1913 | Dickson | 84/483.2 |
| 1,356,416 | A * | 10/1920 | Taft | 84/483.1 |
| 1,526,547 | A * | 2/1925 | Hughey | 84/471 R |
| 1,567,019 | A * | 12/1925 | Barnes | 84/478 |
| 1,806,964 | A * | 5/1931 | Bundy | 84/479 R |
| 2,188,098 | A * | 1/1940 | Bostelmann, Jr. | 84/479 R |
| 2,284,868 | A * | 6/1942 | Heaney | 84/478 |
| 3,185,015 | A * | 5/1965 | Wencil | 84/478 |
| 3,196,732 | A * | 7/1965 | Conner | 84/478 |
| 3,841,192 | A * | 10/1974 | Leonard | 84/485 R |
| 4,295,408 | A | 10/1981 | Pasker | |
| 5,544,562 | A * | 8/1996 | Jeon | 84/470 R |

(Continued)

FOREIGN PATENT DOCUMENTS

GB  2254954 A  * 10/1992

OTHER PUBLICATIONS

Jamey Aebersold Publication: "Exercise for Turnaround No. 2" 1979. Published by Jamey Aebersold, pp. 6, 7, and 13, no month.

(Continued)

*Primary Examiner*—Lincoln Donovan
*Assistant Examiner*—David S. Warren
(74) *Attorney, Agent, or Firm*—Joseph T. Leone, Esq.; DeWitt Ross & Stevens S.C.

(57) ABSTRACT

A method of conveying musical information is described. The method includes the steps of assigning sequential alphabetic and numeric designations as a system of reference to the physical location of individual piano keys on a piano keyboard, the physical location corresponding to the location of the structural form of tonal relationships in the numeric scale of vibrations per second used in the even-tempered, twelve-tone system of Western music, and modeling a musical passage comprised of a series of tones by compiling printed or electronically stored indicia of one or more of the numeric designations, the numeric designation corresponding to the series of tones of the musical passage. A numeric sequence is then presented to a student via visual or auditory means.

12 Claims, 21 Drawing Sheets

U.S. PATENT DOCUMENTS

| | | | | |
|---|---|---|---|---|
| 5,546,843 A | * | 8/1996 | Degaard | 84/478 |
| 5,574,238 A | * | 11/1996 | Mencher | 84/483.2 |
| 5,685,724 A | | 11/1997 | Bubar | |
| 6,288,316 B1 | * | 9/2001 | Fajardo | 84/483.2 |
| 6,388,182 B1 | * | 5/2002 | Bermudez | 84/477 R |
| 6,566,593 B2 | * | 5/2003 | Pertchik | 84/423 R |
| 6,969,793 B2 | * | 11/2005 | Kerkhoff | 84/478 |
| 6,977,334 B2 | * | 12/2005 | Kimbrough | 84/483.1 |
| 7,041,891 B2 | * | 5/2006 | Smith Carter | 84/478 |
| 7,253,349 B1 | * | 8/2007 | Saltsman | 84/424 |
| 2004/0123724 A1 | * | 7/2004 | Funaki | 84/478 |
| 2005/0011339 A1 | * | 1/2005 | Kerkhoff | 84/478 |

OTHER PUBLICATIONS

Mark Levine. "The Jazz Theory Book" 1995. Sher Music Co., pp. 18, 22, 144, 194, no month.

Jerry Coker et al., Patterns for Jazz, 1970, Studio P/R publisher, no month.

William Curtis, First Steps to Ear Training, 1963, Berklee Press Publications, no month.

* cited by examiner

FIG. 2

A = 880 vps
       830.69392 vps
G = 783.99086 vps
       739.98884 vps
F = 698.4564 vps
E = 659.2551 vps
       622.25392 vps
D = 587.32952 vps
       554.3724 vps
C = 523.25112 vps
B = 493.88238 vps
       446.16376 vps A = 440 vps
       415.3046 vps
G = 391.9954 vps
       369.9944 vps
F = 349.228 vps
E = 329.6275 vps
       311.1269 vps
D = 293.6647 vps
       277.1826 vps
C = 261.6255 vps
B = 246.9416 vps
       223.0818 vps
A = 220 vps 1 chord 2 chord (continued, pg.2)

C = 1

3 chord

4 chord

(continued, pg.3)

C = 1

5 chord 6 chord 7 chord 7 chord in the key of C

C = 1

$C = 1$

Hand movement from 4

C = 1

C = 1

1 dominant 7 chord          1 dominant 7 chord (root position)

Performance Pattern Built from the Basic Stretch

LH: hand movement from 4.   RH: 4 chord second inversion

LH: hand movement from 1.   RH: 1 chord root position.

LH: hand movement from 4.   RH: 4 chord second inversion

LH: hand movement from 5.   RH: 5 chord second inversion

METHOD OF CONVEYING MUSICAL INFORMATION

CROSS-REFERENCE TO RELATED APPLICATIONS

This is a continuation-in-part of application Ser. No. 10/727,368, filed Dec. 4, 2003 now abandoned, which claims priority to provisional application Ser. No. 60/431,111, filed Dec. 5, 2002. Both priority applications are incorporated herein by reference.

FIELD OF THE INVENTION

The invention is directed to a method of teaching musical theory, composition, and performance by relating musical tonality, structural form and motion to a numeric scheme that is easily understood by children and adult students and easily visualized using a standard piano keyboard.

BACKGROUND

The twelve-tone, even-tempered system of Western music is the primary subject of traditional music education curriculum. Twelve musical tones are identified by the number of vibrations per second (vps) which cause a sound wave. The sound wave is heard as a musical tone (pitch).

The numeric scale of vibrations per second (vps) is a music industry standard to which musical instruments are calibrated to produce one or more sets of twelve musical sound waves. A musical sound wave is produced by some form of motion causing the musical instrument to vibrate. For instance, when a piano key is pressed down, a small hammer head strikes a group of piano strings inside of the piano. A piano tuner technician tunes each set of piano strings to produce a specific number of vibrations per second when the hammer head strikes the piano strings. The number of vps the piano strings are tuned to produce is defined by the music industry standard scale of numeric vps.

In traditional music education curriculum, seven alphabetic symbols, A, B, C, D, E, F and G are assigned to seven of the twelve numeric vibrations per second in the music industry numeric scale of vps. In the operating system of traditional music education curriculum, the functional role of the seven alphabetic symbols is designated to represent the fixed identity of seven musical tones.

In traditional music education curriculum, the five additional numeric vps of the twelve-tone, even-tempered system of Western music are designated as being "sharps" (♯) or "flats" (♭) of the seven primary alphabetic designations. Thus, traditional music teaching systems utilize seventeen symbols to represent the fixed identity of twelve musical tones as the core foundation upon which the entire operating system of teaching is built.

Multiple sets of the twelve-tone system are created by doubling the number of vibrations per second of each sound wave in the set, or by decreasing the number of vibrations per second of each sound wave in the set by exactly half.

The individual musical tones in each set of twelve tones are said to be related to each other by the correlation between the number of vibrations per second which cause the sound wave (exactly double or exactly half). The correlation of the numeric vps relationship between the individual tones in each twelve-tone group is represented by the conventional alphabetic symbol. The alphabetic symbol designated as the fixed identity of the musical tone remains the same in each twelve-tone group.

In traditional music education curriculum, the core foundation of the system of teaching is built upon the functional role of the alphabetic symbol being equal to (or being the same as) the functional role of the numeric vps as the fixed identity of the individual musical tone. In other words, the relationship between the alphabetic symbol and the numeric vps is reciprocal. Both symbols function as the fixed identity of the musical tone in the twelve-tone system of Western music. The functional role of the alphabetic symbol as the fixed identity of a musical tone is derived from the original equation where a unique alphabetic symbol is assigned to each of seven sound waves in the numeric scale of vps, for example, A=440 vps.

In the operating system of traditional music education curriculum, the functional role of the alphabetic symbol as the fixed identity of a musical tone is integrated into the curriculum by assigning the alphabetic symbol to the fixed identity of the lines and spaces of the musical staff, and to the different parts of musical instruments used to produce the individual musical tones, for example, the white and black keys of the piano.

In traditional music education curriculum, the term "music scale" refers to a collection of musical pitches (tones) arranged in order from lowest to highest or from highest to lowest.

In traditional music education curriculum, the music scale referred to as a "major" scale refers to a collection of seven musical pitches.

A system of numeric symbols, traditionally seven roman numerals, are assigned to designate the order in which the musical pitches occur in the collection of musical pitches referred to as the music scale.

The numbered position of the individual musical pitch within a music scale is referred to as the "scale degree."

In traditional music theory curricula referring to Western music tonality, each pitch of a music scale is considered to function in a particular way with respect to the others. Therefore, scale degrees are both numbered (traditionally with roman numerals) and named, as follows: I=tonic, II=supertonic, III=mediant, IV=subdominant, V=dominant, VI=submediant, and VII=leading tone or subtonic.

In the traditional music education operating system, the "C major scale" consists of the following order of seven musical pitches: C, D, E, F, G, A, and B.

In the C major scale, the musical pitch C is placed in the first degree of the music scale referred to as the tonic. The musical pitch D is then placed in the second degree of the scale referred to as the supertonic. The musical pitch E is in the third degree of the scale referred to as the mediant. The musical pitch F is in the fourth degree of the scale referred to as the subdominant. The musical pitch G is in the fifth degree of the scale referred to as the dominant. The musical pitch A is in the sixth degree of the scale referred to as the submediant, and the musical pitch B is in the seventh degree of the scale referred to as the leading tone or subtonic.

In the music scales taught by traditional music education curricula, the alphabetic symbol which identifies the musical pitch in the music scale is represented to be equal to the numeric symbol of the scale degree.

For example, in the C major scale, C=1, D=2, E=3, F=4, G=5, A=6, and B=7

When the alphabetic symbol representing the fixed identity of the musical pitch placed in the first degree of the music scale is changed, the entire set of alphabetic symbols representing the fixed identity of the collection of musical pitches in the subsequent scale degrees also change.

For example, in the D major scale, D=1, E=2, F♯=3, G=4, A=5, B=6, and C♯=7.

In the G major scale, G=1, A=2, B=3, C=4, D=5, E=6, and F♯=7.

In the A major scale, A=1, B=2, C♯=3, D=4, E=5, F♯=6, G#=7.

As previously stated, the operating system of traditional music education curricula utilizes seventeen different symbols, A, A♯, B♭, B, C, C♯, Db, D, D♯, E♭, E, F, F♯, G♭, G, G♯, and A♭ to identify twelve musical tones, any one of which may be placed in the first scale degree of a major scale, thereby generating seventeen different possible orders of seven alphabetic symbols used to represent the tonal relationship of a collection of musical pitches defined by the musical term "major scale."

In the conventional operating system of traditional music education curricula, the numeric designations function as a system of reference to a constantly changing set of alphabetic symbols used to identify the individual components of musical terms.

In the operating system of traditional music education curriculum, music chords are formed by selecting three or more musical pitches from a music scale to be played simultaneously.

In traditional music education curriculum, the musical term "I chord" refers to the fixed alphabetic identity of each of the three musical pitches which occupy the 1st, 3rd and 5th positions of a major scale. The "I chord" is understood to be equal to 1, 3 and 5 of the major scale. The three numeric symbols, however, are a reference to three unique alphabetic symbols representing the fixed identity of three musical tones.

In the key of C where C is equal to I, the three musical tones which the musical term "I chord" refers to, located in the 1st, 3rd and 5th positions of the C major scale, are identified as C, E and G.

In the key of G, where G is equal to I, the three musical pitches which the musical term "I chord" refers to, located in the 1st, 3rd and 5th positions of the G major scale, are identified as G, B and D.

In the key of A, where A is equal to I, the three musical pitches which the musical term "I chord" refers to, located in the 1st, 3rd and 5th positions of the A major scale, are identified as A, C♯, and E.

In the operating system of traditional music education curriculum, the term "I chord" referring to the musical pitches which occupy the positions 1, 3 and 5 of a music scale, refers to a constantly changing set of alphabetic symbols representing the fixed identity of the individual components of a three-tone cluster of musical pitches. In the conventional operating system of traditional music education curriculum, the three musical pitches of the I chord which occupy the 1st, 3rd and 5th positions of a major scale are dependent on the alphabetic symbol which identifies the musical pitch placed in the first position or tonic of the music scale.

The functional role of the numeric symbols in the operating system of traditional music education curriculum is derived from and is therefore directly linked to the core foundation of the operating system which defines the functional role of the alphabetic symbol as the fixed identity of the musical pitch the numeric symbol represents.

The functional roles of the alphabetic and numeric symbols in the operating system of traditional music education curriculum produce massive amounts of information necessary to comprehend the tonal relationship components of musical terms.

SUMMARY OF THE INVENTION

A critical distinction between the operating system of traditional music education curriculum and the present invention is directly related to the core foundation of the functional role of the alphabetic and numeric symbols. The present invention does utilize alphabetic symbology. In the present invention, the structural form of tonal relationships, referred to as music vocabulary, is defined as the form itself, and not by individual components of that form. The alphabetic and numeric indicia are utilized as a single point of reference to the physical location of the structural form of tonal relationships on the piano keyboard. By changing the functional role of the alphabetic and numeric symbols in the operating system of the teaching curriculum, the present invention has created new algorithms dramatically reducing a process which involved massive amounts of procedural steps and musical information to single numeric or alphabetic designations, the designation referring to the location of a piano key on the piano keyboard.

The invention is directed to a method of denoting, storing (in written or electronic format) and conveying (by written, printed, or otherwise displayed indicia) musical information via alphabetic and numeric indicia relating to a standard piano keyboard. The method comprises assigning seven alphabetic symbols as a point of reference to the physical location of seven piano keys on the piano keyboard. The alphabetic symbol functions as a point of reference to the physical location of the piano key which is to be designated as number I of seven sequential numeric designations. Once the alphabetic symbol provides the student with a reference to the physical location of the piano key designated as number I, the alphabetic symbols have no further role in the operating system of the Numeric Language of Music.

In the preferred embodiment, the structural form of tonal relationships, referred to as music vocabulary, is defined by the physical distance between each piano key in a specified group of piano keys. The numeric symbols function as a point of reference to a single, physical location from which the structural form of music vocabulary (interval distance between the piano keys) is formed. In the present invention, tonal relationships, such as a "major chord", are defined as a single, structural form in contrast to traditional curriculums which define tonal relationships by a fixed symbolic identity, alphabetic or numeric, to the individual components of that form. Music vocabulary templates are provided to the student as visual diagrams of the structural forms of tonal relationships used in the even-tempered, twelve-tone system of Western music. Music vocabulary templates are introduced to the student via written, printed, or electronic visual means or auditory means (e.g., via recordings or spoken voice). The music vocabulary templates used in the present invention can be memorialized via hand-writing, printing, or storage in electronic or electromagnetic media, such as a programmable computer, CD device, DVD device, magnetic tape, magnetic disk, etc. (i.e., via any means now known in the art or developed in the future for fixing indicia in a tangible medium of expression).

As noted previously (par. 0004) motion is a necessary component to cause a musical instrument to produce a musical pitch. In the present invention, the motion used to press the piano keys down combining musical tones into a comprehensive expression of music vocabulary is referred to as a "hand movement".

In the present invention, the category of motion includes multiple patterns of hand movements, used to combine the tones of the music vocabulary into the fluent performance of comprehensive musical passages. Motion templates, consisting of patterns of hand movements and rhythm, are introduced to the student via written, printed, or electronic visual means or auditory means (e.g., via recordings or spoken voice). The templates of motion used in the present invention can be memorialized via hand-writing, printing, or storage in electronic or electromagnetic media, such as a programmable computer, CD device, DVD device, magnetic tape, magnetic disk, etc. (i.e., via any means now known in the art or developed in the future for fixing indicia in a tangible medium of expression).

A sequence of numeric designations are then presented to the student. The numeric designations represent the physical location of the piano key from which the hand movements begin in addition to representing the structural form (interval distance between a selected group of piano keys) which defines the music vocabulary where the hand motion occurs. The motion template defines the order and the pattern of rhythm the musical tones occur in the performance of the music vocabulary. In this way, entire musical passages are represented by single numeric designations. The numeric sequence model is provided to a student via written, printed, or electronic visual means or auditory means (e.g., via recordings or spoken voice).

In the present invention, the piano keyboard is utilized as a visual diagram of the structural form of tonal relationships which defines the music vocabulary of the twelve-tone system of Western music. The structural form of tonal vocabulary of the language of music learned via the piano keyboard is then introduced as a single, constant form which can be assigned to be performed by other instruments in music orchestration, depending on an instrument's tonal range capacity.

The written symbols of music literature are then presented to the student as symbolically representing the previous information.

The indicia used in the present invention can be memorialized via hand-writing, printing, or storage in electronic or electromagnetic media, such as a programmable computer, CD device, DVD device, magnetic tape, magnetic disk, etc. (i.e., via any means now known in the art or developed in the future for fixing indicia in a tangible medium of expression). Thus, a particularly preferred version of the invention comprises a method to convey musical information comprising (a) designating a numeric value of vibrations per second (vps) for each pitch of a first group of pitches in an even-tempered, Western-style, twelve-tone group of musical pitches; wherein each numeric value is a fixed identity of its corresponding pitch; (b) designating a corresponding number of vibrations per second in recurring groups of twelve pitches in the even-tempered, Western-style, twelve-tone group of musical pitches, wherein in each recurring group, the number of vibrations per second per pitch is integrally proportional or integrally inversely proportional to the corresponding vibrations per second in the first group of pitches; and wherein each numeric value is a fixed identity of its corresponding pitch; (c) designating white and black keys of a piano keyboard as a visual diagram representing the pitches designated by steps (a) and (b); (d) assigning seven sequential alphabetic symbols, A, B, C, D, E, F and G as an independent system of reference to physical locations of seven contiguous white keys in a structural form of each recurring group of twelve piano keys, wherein the alphabetic symbol C is assigned to a white key located left of a group of two black keys on the piano keyboard; (e) designating the alphabetic symbol as a single point of reference to the physical locations of a piano key from which a defined interval relationship between a selected group of piano keys is formed; wherein the piano keys are a visual diagram representing the pitches designated by steps (a) and (b); (f) assigning seven sequential numeric designations, 1, 2, 3, 4, 5, 6 and 7, as a system of reference to the physical location of a corresponding selected group of seven piano keys on the piano keyboard, wherein the sequential numeric designations correspond to a defined physical distance and interval relationship between each piano key in the selected group of seven piano keys, and wherein the physical location of the piano keys also correspond to the group of pitches of step (a) and (b); (g) designating the numeric symbols as a single point of reference to the physical location of a piano key from which a defined physical distance and interval relationship between a selected group of piano keys is formed, the piano keys also corresponding to the pitches of step (a) and (b); (h) designating tonal relationships utilized in composing music in the even-tempered, twelve-tone system of Western music as music vocabulary; (i) defining the music vocabulary of step (h) as structural forms represented by a fixed interval distance between each piano key in a selected group of piano keys, which distance remains identical from any designated location on the piano keyboard, the designated location represented by a single alphabetic or numeric symbol; wherein the physical location of the piano keys also correspond to the pitches of step (a) and (b); (j) defining keyboard diagrams corresponding to the music vocabulary of step (i) as music vocabulary templates; (k) assigning the structural forms of step (i) to selected groups of three piano keys corresponding to the sequential numeric designations 1, 2, 3, 4, 5, 6 and 7 of step (f), as seven primary chords, wherein each numeric designation uniquely denotes a group of three piano keys with an interval relationship as follows; primary chords 1, 4 and 5 designate a group of three piano keys where the physical location of the first piano key of the group of three piano keys is identified by the numeric designation 1, 4 or 5, the second piano key in the group of three piano keys is located four piano keys to the right of the numeric designation of the chord, and the third piano key in the group of three piano keys is located three piano keys to the right of the second piano key of the chord; primary chords 2, 3 and 6 designate a group of three piano keys where the physical location of the first piano key of the group of three piano keys is identified by the numeric designation 2, 3 or 6, the second piano key in the group of three piano keys is located three piano keys to the right of the numeric designation of the chord, and the third piano key in the group of three piano keys is located four piano keys to the right of the second piano key of the chord; and primary chord 7 designates a group of three piano keys where the physical location of the first piano key of the group of three piano keys is identified by the numeric designation 7, the second piano key in the group of three piano keys is located two piano keys to the right of the numeric designation of the chord, and the third piano key in the group of three piano keys is located two piano keys to the right of the second piano key of the chord; and wherein the piano keys of the chord also correspond to the group of pitches of step (a) and (b); (l) designating keyboard diagrams of structural forms of hand movements as motion templates visually representing defined motions of a player's hands to perform music vocabulary templates in pre-set tonal orders and patterns of rhythm, the motion templates providing a structural form of hand movements which remain identical from any physical location on the piano keyboard, wherein the physical location of the motion template on the piano keyboard is designated by a single numeric symbol; (m) modeling a musical passage by compiling a pattern of printed or electronically-stored indicia of one or more numeric designations selected from the group consisting of the numeric designations of step (f) and (n) providing the model of step (m) to a student via visual or auditory means.

BRIEF DESCRIPTION OF THE DRAWINGS

FIG. 2: The numeric scale of vps referred to as the music scale as defined in the present invention.

DETAILED DESCRIPTION OF THE INVENTION

Figure 1:
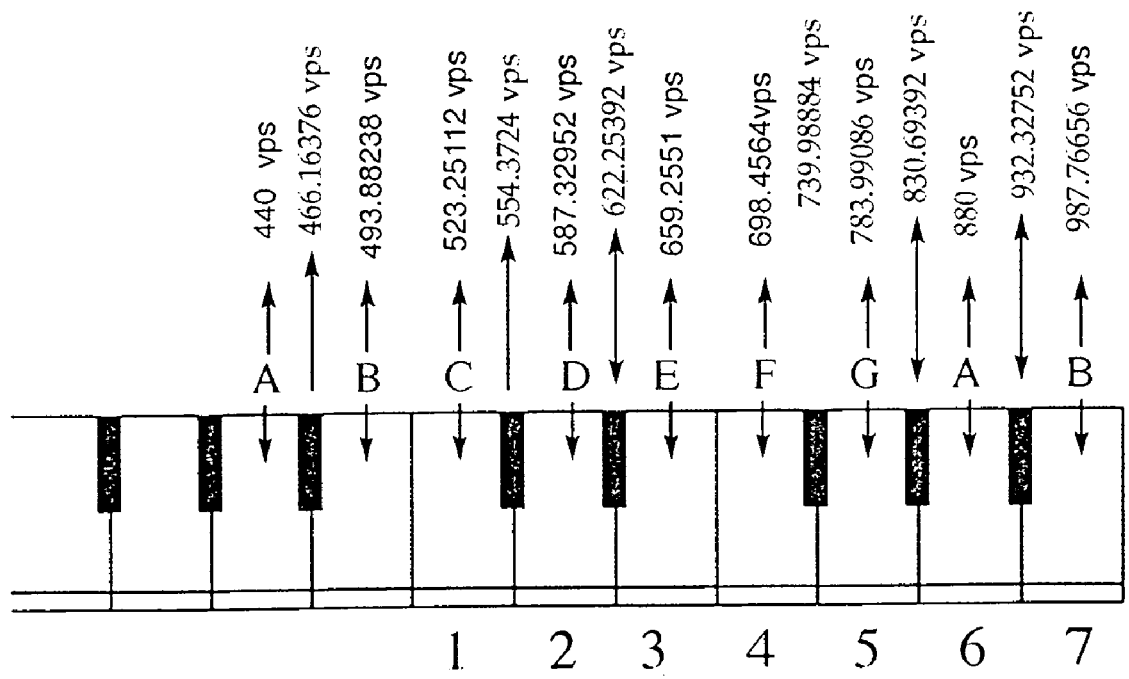
FIG. 1: Diagram of the functional role of alphabetic and numeric symbols in relationship to the piano keyboard.

In the present invention, the musical term "music scale" refers to the music industry's standard numeric scale of vibrations per second which defines multiple sets of twelve musical tones utilized in the even-tempered, twelve-tone system of Western music. In the present invention, the musical term "music scale" has no further application in the operating system of the Numeric Language of Music (see FIGS. 1 and 2).

Figure 3:
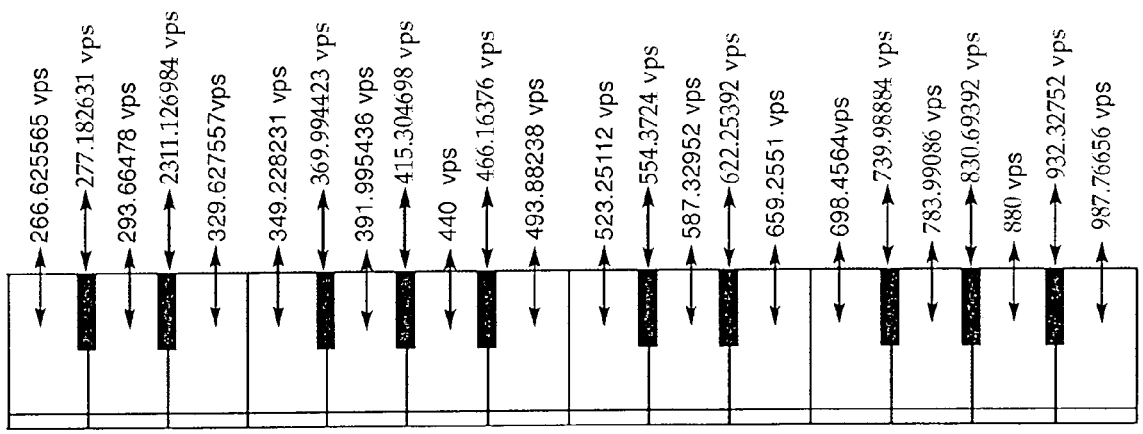
FIG. 3: Diagram of the black and white piano keys of a piano keyboard used as a visual diagram of the music scale.

The piano keyboard is presented to the student as a black and white visual diagram representing the numeric scale of vps in the order the musical tones occur in the music scale (see FIG. 3).

Seven alphabetic symbols are assigned as a system of reference to seven numeric vps in each group of twelve musical tones in the music scale. The seven numeric vps to which a unique alphabetic symbol is assigned are referred to as the primary tones of the twelve-tone system of Western music.

Figure 4:
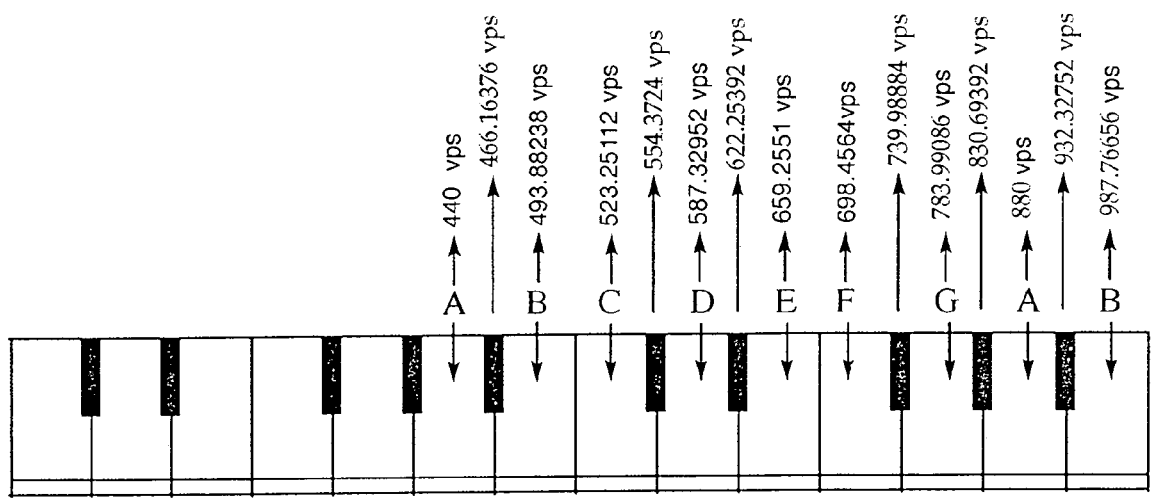
FIG. 4: Diagram of the alphabetic relationship between the primary tones of the music scale and the piano keyboard.

In the present invention, the alphabetic symbols represent a relationship between the seven primary tones of the music scale (numeric vps) and a physical location on the piano keyboard where motion occurs to generate a specific musical sound wave. In the present invention, the alphabetic symbols do not represent a fixed identity of a musical tone or a fixed identity of the individual piano key. The alphabetic symbol represents the relationship between the two properties (see FIG. 4).

In the present invention, the white keys of the piano are presented as a visual diagram representing the seven primary tones of the Numeric Language of Music.

Figure 5:
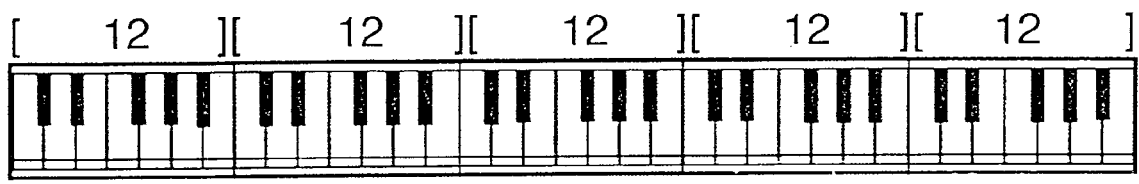
FIG. 5: Diagram of the structural form of a piano keyboard.

The black keys of the piano represent the physical location of five secondary musical tones which are considered to be altered forms (sharps or flats) of one of the seven primary musical tones. Multiple sets of the twelve musical tones in the twelve-tone, even-tempered system of Western music are visually represented by the repetition of the physical appearance (structural form) of twelve black and white keys of the piano (see FIG. 5).

In the present invention, seven alphabetic symbols, A, B, C, D, E, F and G are presented to the student as an independent system of reference. Each alphabetic symbol functions as a point of reference to the physical location of a single piano key on the piano keyboard. The functional role of the alphabetic symbol is to locate the piano key which is designated as the root of the structural form of music vocabulary. In the present invention, this is the sole function of the alphabetic symbols in the operating system of the Numeric Language of Music.

Music vocabulary is formed by selecting and combining musical tones together similar to how we select and combine letters of the English alphabet to form words. In the present invention, music vocabulary is defined as the physical distance between each piano key in a selected group of piano keys, referred to as the "interval distance". The structural form of music vocabulary is provided to the student as a single template which remains the same regardless of the physical location on the piano keyboard. The physical location of the music vocabulary on the piano keyboard is indicated by a single alphabetic or numeric designation.

The first template of music vocabulary presented to the student is referred to as the "primary numeric alphabet." The primary numeric alphabet is formed by assigning the sequential numeric designations 1, 2, 3, 4, 5, 6 and 7 as points of reference to the physical location of seven piano keys on the piano keyboard.

In the present invention, the alphabetic symbol indicates the piano key which is equal to number I of the structural form of the primary numeric alphabet, or the "root" of the structural form as defined by the music vocabulary template. In the present invention, the structural form of all tonal relationship, referred to as "music vocabulary" is defined as the physical distance between each piano key in a selected group of piano keys which creates the form, and not by a fixed identity to the individual components (piano keys) of that form.

The white piano key located to the left of the group of two piano keys is referred to by the alphabetic symbol "C." The musical term "in the key of C" indicates that this piano key is the physical location assigned the numeric designation of number 1 of the primary numeric alphabet.

Figure 6:
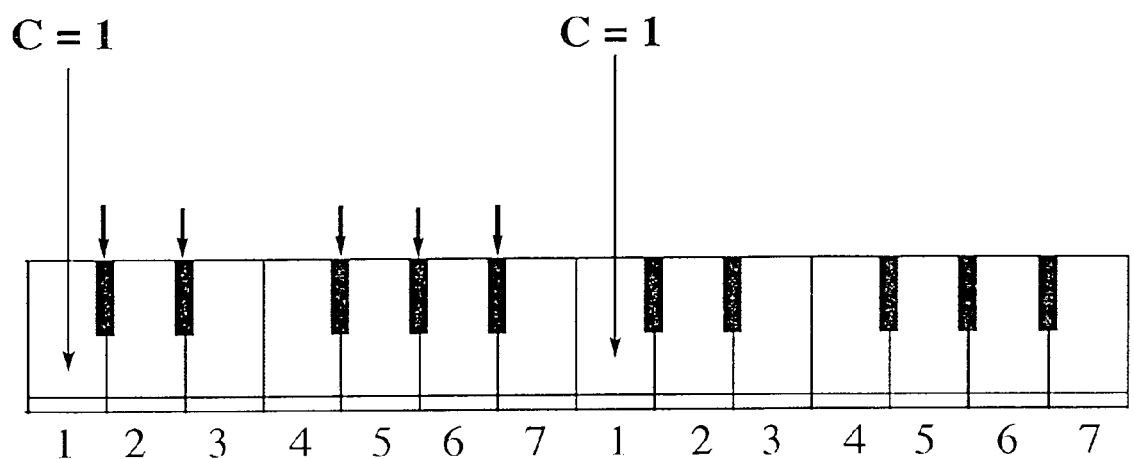
FIG. 6: Music Vocabulary template of a primary numeric alphabet.

Moving from left to right, each white key is assigned the sequential numeric designations of 2, 3, 4, 5, 6 and 7 (see FIG. 6).

In the operating system of the numeric language of music, the numeric designations I, 2, 3, 4, 5, 6 and 7 are the only numeric designations used to represent the structural form of tonal relationships utilized in the twelve-tone system of Western music. Once a numeric designation has been assigned to a piano key, the piano key located in the same position in each group of twelve piano keys retains the same numeric designation (see FIG. 6).

In the key of C, what would have been the eighth white key is in the same position as the first white key, located to the left of the group of two black keys. In the present invention, the numeric symbol 8 does not exist. The musical term "octave", a Latin word referring to the number eight, is used to define the distance between any two like musical tones. For example, in the key of C, the piano key located to the left of a group of two black keys, anywhere on the piano keyboard, is assigned the numeric designation I. The distance between any two piano keys located to the left of the group of two black keys is referred to as an octave In the present invention, each of the seven numeric designations which refer to the physical location of a group of seven piano keys creating the structural form (template) of the primary numeric alphabet, are defined as the physical distance between the individual piano keys.

Utilizing the piano keyboard as a visual diagram, in the key of C, it is visually obvious that one piano key (black) is skipped between each numeric designation with the exception of 3 and 4, and 7 and 1. The numeric designations 3 and 4, and 7 and I are directly adjacent to each other (see FIG. 6).

In the present invention the music vocabulary templates present the student with a diagram of the piano keyboard representing the structural forms of tonal relationships which define the music vocabulary of the twelve-tone system of Western music. Each music vocabulary template diagram of the physical distance between a selected group of piano keys which defines music vocabulary remains the same regardless of the physical location of the music vocabulary on the piano keyboard.

Figure 7:
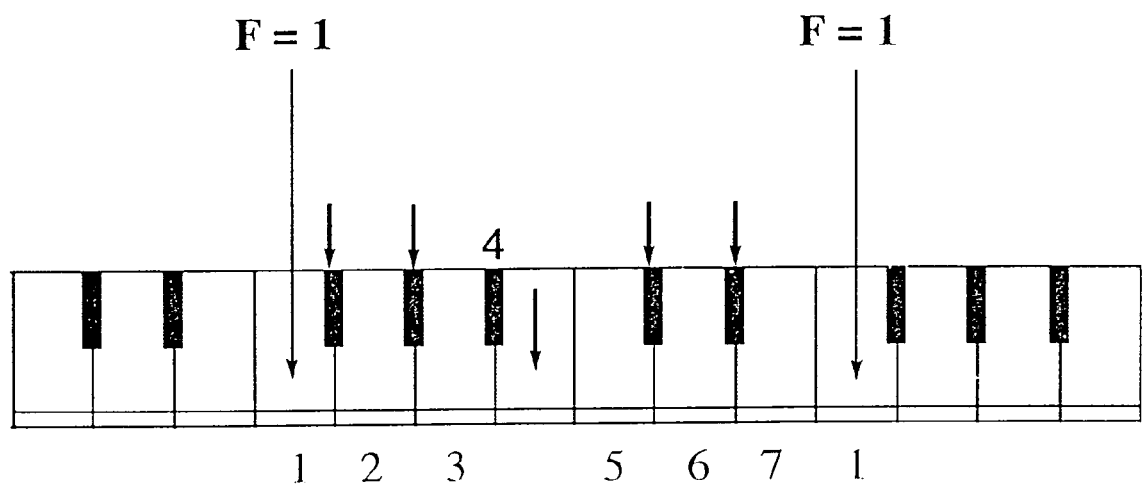
FIG. 7: Diagram of the primary numeric alphabet in the key of F

The music vocabulary template of a "primary numeric alphabet" can be moved to different locations on the piano keyboard. For example, in the key of F, the alphabetic system of reference assigns the white key located to the left of the group of 3 black keys the numeric designation of number I on the piano keyboard. The numeric designation of number 2 is defined by a piano key's physical distance from number 1. In any key, the numeric designation 2 is defined as two piano keys to the right of number I. The numeric designation 3 is defined as two piano keys to the right of number 2. The numeric designation 4 is defined as one piano key to the right of number 3. The numeric designation 5 is defined as two piano keys to the right of number 4. The numeric designation 6 is defined as two piano keys to the right of number 5. The numeric designation 7 is defined as two piano keys to the right of number 6 (see FIG. 7).

Musical tones are selected from the primary numeric alphabet and combined together to form basic music vocabulary similar to how we select letters from the alphabet and combine them to form simple words used in English vocabulary.

In the Numeric Language of Music, the second template of basic music vocabulary is referred to as "the seven primary chords".

A primary chord is formed by selecting every other piano key from the primary numeric alphabet for a total of three piano keys to be played at the same time or combined together in various orders of arrangement. The primary chord is identified by the numeric value it begins with.

Figure 8:
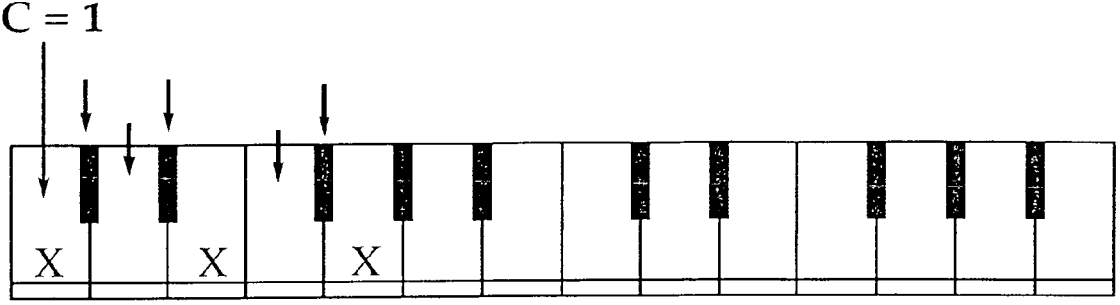
FIG. 8: Music Vocabulary template of the seven primary chords.
Figure 8:
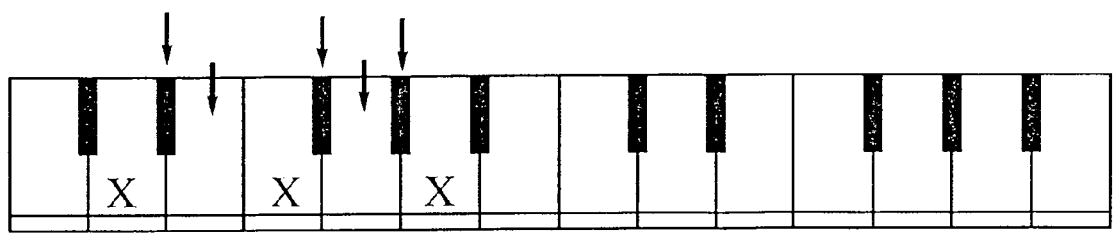
Figure 8:
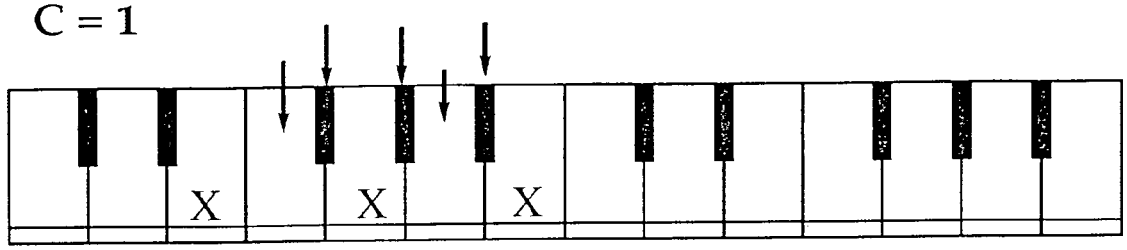
Figure 8:
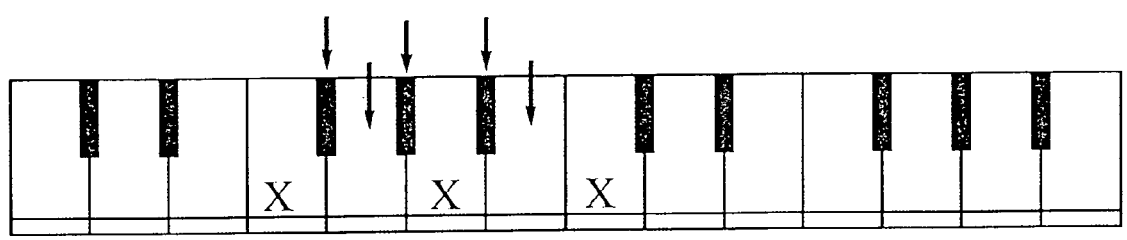
Figure 8:
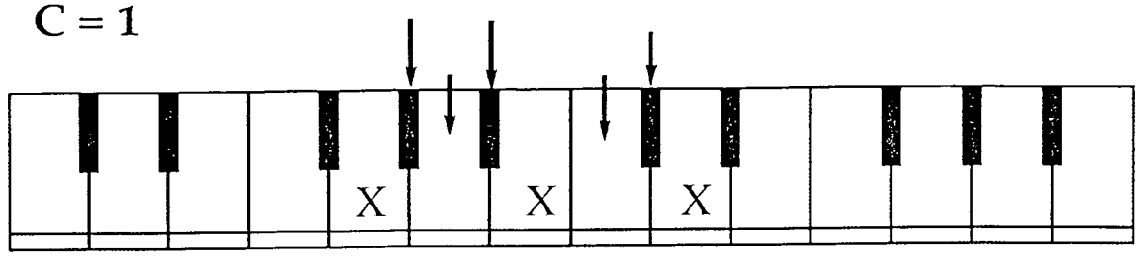
Figure 8:
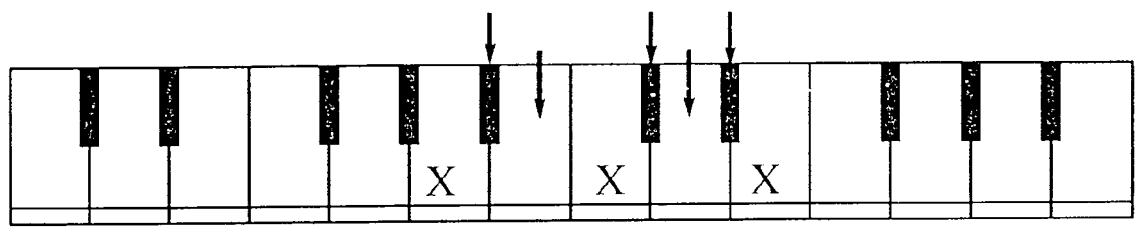
Figure 8:
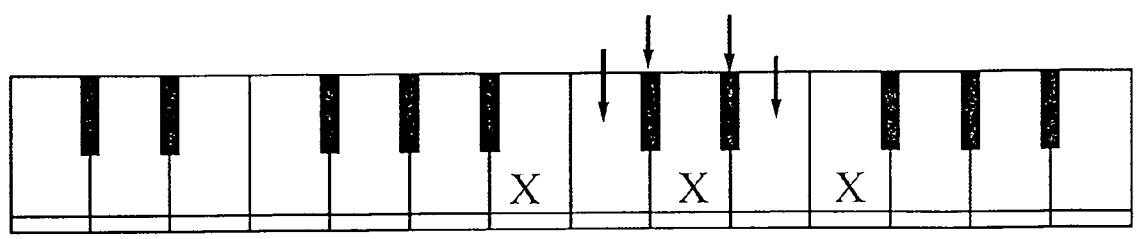

In the key of C, the I chord is formed by selecting every other white key beginning with the numeric designation 1. The 2 chord is formed by selecting every other white key beginning with the numeric designation 2. The 3 chord is formed by selecting every other white key beginning with the numeric designation 3. The 4 chord is formed by selecting every other white key beginning with the numeric designation 4. The 5 chord is formed by selecting every other white key beginning with the numeric designation 5. The 6 chord is formed by selecting every other white key beginning with the numeric designation 6. The 7 chord is formed by selecting every other white key beginning with the numeric designation 7 (see FIG. 8).

In the present invention the musical term "1 chord" refers to a specified group of three piano keys. Note that, in the present invention, the three piano keys which form each of the seven primary chords on the piano keyboard are first introduced to the student in the key of C as every other white key beginning with the physical location of the piano key represented by a single numeric designation.

In the present invention, the numeric designations function as a system of reference to single physical locations on the piano keyboard from which a defined interval structure is formed. In the present invention, the numeric designations do not function as the fixed identity of a piano key or the fixed identity of a musical pitch. Therefore, in the present invention, the musical term "I chord" is not defined as 1, 3 and 5 of the primary numeric alphabet (see FIG. 8).

In the present invention, a music vocabulary template provides the student with a visual keyboard diagram of the structural form of the music vocabulary referred to as the 1 chord. The template representing the structural form of the "I chord" skips three piano keys between the 1st and 2nd piano keys of the 1 chord, and skips two piano keys between the 2nd and 3rd piano keys of the 1 chord. The alphabetic symbol refers to the physical location of the piano key designated as number 1 (see FIG. 8).

Each of the seven primary chords are sub-categorized into different classifications of music vocabulary such as a major chord, a minor chord, or a half-diminished chord. In the present invention, all sub-category classifications of chords are defined by the fixed interval relationship between a selected group of piano keys. The sub-category classification of each primary chord is determined by the physical distance (fixed interval relationship) between each piano key in the group of three piano keys. Note that, in the present invention, the fixed interval relationship between selected groups of piano keys defines the sub-category classification of music vocabulary, and not a fixed numeric or alphabetic identity to the individual piano keys. Music vocabulary templates are provided to the student containing visual piano keyboard diagrams of the structural form (interval distance between a selected group of piano keys) used to define the sub-category classifications of music vocabulary as defined in the present invention.

Figure 9:
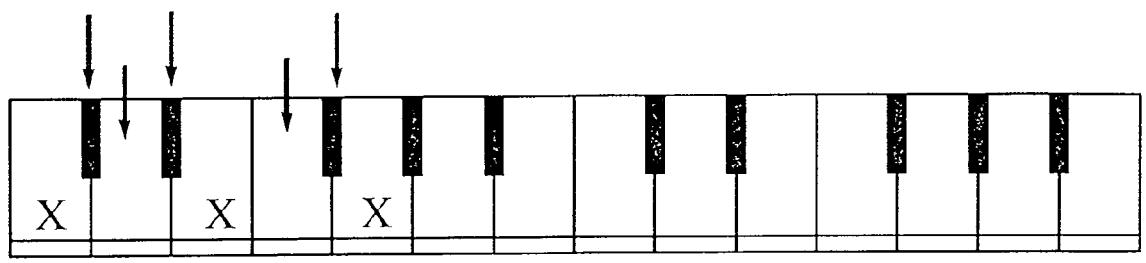
FIG. 9: Music Vocabulary template of a major chord.
Figure 9:
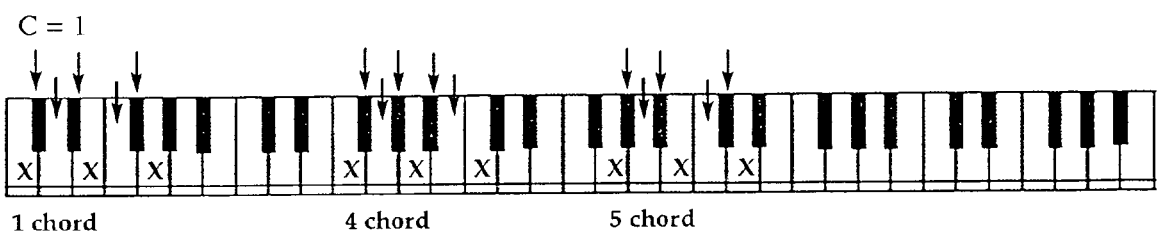

Moving from left to right on the piano keyboard, the music vocabulary template of a "major chord" skips 3 piano keys between the 1st and 2nd piano key of the chord, and skips two piano keys between the 2nd and 3rd piano key of the chord. By studying the black and white diagram of the piano keyboard in the key of C, the student can easily see that the 1, 4 and 5 chords have the same structural form which places them in the sub-category classification of "major" chords (see FIGS. 8 and 9).

Figure 10:
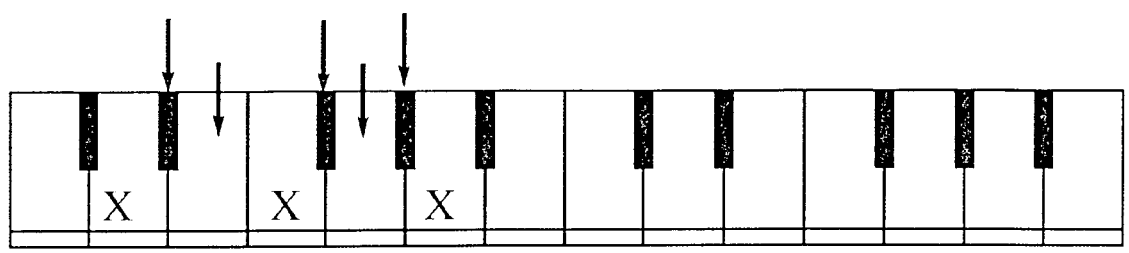
FIG. 10: Music Vocabulary template of a minor chord.
Figure 10:
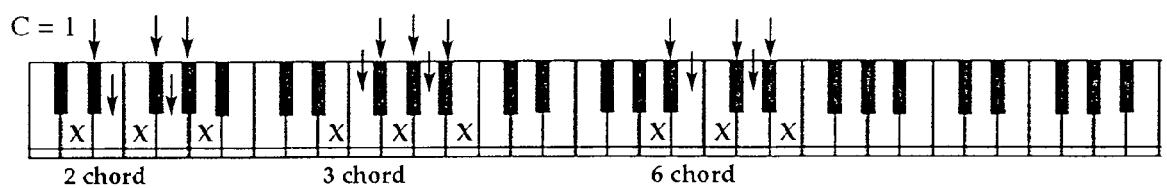

Moving from left to right on the piano keyboard, the music vocabulary template of a "minor" chord skips 2 piano keys between the 1st and 2nd piano key of the chord, and skips three piano keys between the 2nd and 3rd piano key of the chord. By studying the black and white diagram of the piano keyboard in the key of C, the student can easily see that the 2, 3 and 6 chords have the same structural form which places them in the sub-category classification of "minor" chords (see FIGS. 8 and 10).

Figure 11:
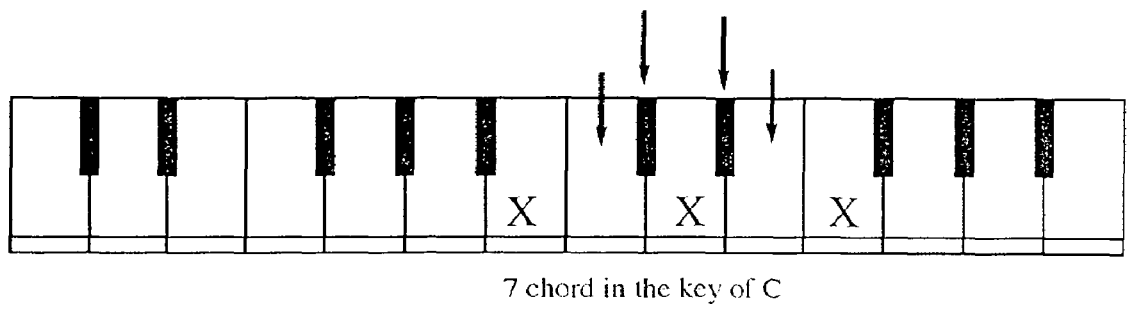
FIG. 11: Music Vocabulary template of a half-diminished chord.

Moving from left to right on the piano keyboard, the music vocabulary template of a "half-diminished" chord skips two piano keys between the 1st and 2nd piano key of the chord, and skips two piano keys between the 2nd and 3rd piano key of the chord. By studying the black and white diagram of the piano keyboard in the key of C, the student can easily see that the structural form of the 7th primary chord places the 7 chord in the sub-category classification of a "half-diminished" chord (see FIGS. 8 and 11).

Understanding the functional role of the alphabetic and numeric symbols as defined in the present invention is of critical importance to understanding the present invention. In the present invention, the alphabetic symbols and the numeric symbols function as separate systems of reference to single physical locations on a musical instrument from which the structural form of music vocabulary (interval distance between selected groups of musical tones) is defined. In the present invention, the alphabetic and numeric symbols do not represent the fixed identity of each of the musical tones which comprise the selected tones of the music vocabulary, or a fixed identity of the individual physical parts of musical instruments such as the black and white keys of a piano.

As stated previously (paragraph 0004), a musical sound wave is produced by some form of motion which causes a specific number of vibrations per second to occur. In the present invention, the category of motion refers to the motion which will cause a musical instrument to vibrate creating one or more musical sound-waves (numeric vps). In the example of the piano, the category of motion refers to the motion of the hands used to press the piano keys down.

The structural form of music vocabulary can be expressed in many different ways by the pattern of motion used to perform the music vocabulary. This is referred to as the "arrangement" of the music.

In the present invention, the category of motion presents the student with multiple choices of hand movements used to express basic music vocabulary. The hand movements in the category of motion in the present invention are presented as individual templates which can be memorialized via handwriting, printing, or storage in electronic or electromagnetic media, such as a programmable computer, CD device, DVD device, magnetic tape, magnetic disk, etc. (i.e., via any means now known in the art or developed in the future for fixing indicia in a tangible medium of expression).

Figure 12:
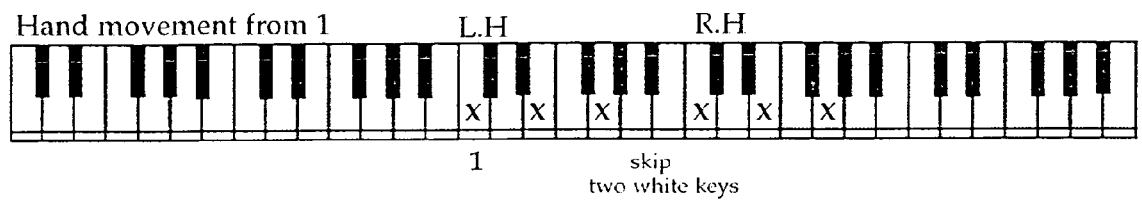
FIG. 12: Motion template No. 1.
Figure 12:
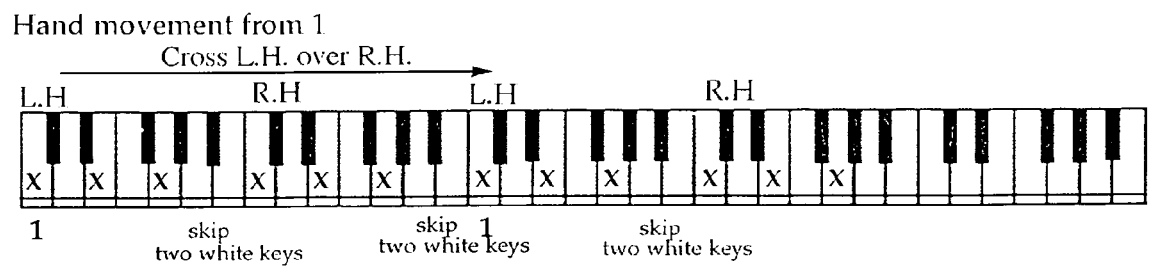

For example, the three piano keys of the 1 chord in the key of C may be played simultaneously with the both the left hand and the right hand. Moving from left to right, the I chord in the key of C may be played one piano key at a time first with the left hand followed by the right hand. Moving from left to right, the I chord in the key of C may be played 4 times, playing 1 piano key at a time first with the left hand, followed by the right hand, crossing the left hand over the right hand playing the I chord 1 piano key at a time followed by the right hand to finish the performance of an impressive musical phrase expressing the music vocabulary referred to as the "1 chord" across the entire piano keyboard (see FIG. 12).

Figure 13:
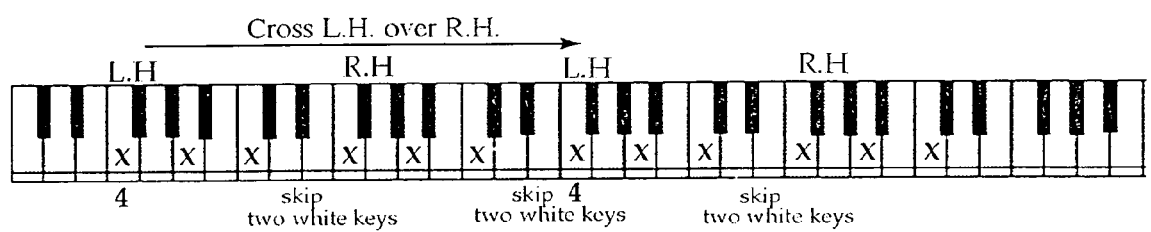
FIG. 13: Diagram of hand movement no. 3 in Motion template No. I (FIG. 12) repeated from the numeric designation 4.

Once the student is comfortable with the hand movement used to perform the 1 chord fluently across the piano keyboard, the student is instructed to use the same hand movement beginning with the numeric designation 4. The single numeric designation conveys to the student the physical location on the piano keyboard where the hand movement begins. The numeric designation also conveys to the student the structural form of the music vocabulary (the physical location of three piano keys) which are to be played by the hand movement. The Motion template tells the student the order and pattern of rhythm in which the musical tones of the music vocabulary are performed (see FIG. 13).

Just as simple words are combined to form simple sentences, and simple sentences are combined to form simple paragraphs in the study of English vocabulary and grammar, the structural form of a music composition is created by combining simple music vocabulary in multiple ways. For example, the structural form of the music composition "Pachaelbel's Canon" is constructed with the following numeric sequence template of music vocabulary as defined in the present invention: 1/5/6/3/4/1/4/5. A student of the Numeric Language of Music quickly learns multiple ways to arrange the performance of the music vocabulary of this famous composition by choosing from different motion templates to perform the music vocabulary indicated by the numeric sequence. By studying the numeric sequence templates of music vocabulary used as the structural foundation of famous music compositions, the student learns how to apply music vocabulary to compose the structural forms of original music compositions.

Figure 14:
FIG. 14: Music Vocabulary template of a major 7th chord.

More complex music vocabulary is formed by adding musical tones to the structural form of the primary chords. For instance, the music vocabulary classified as a "major 7th" chord adds one piano key to the structural form of a major chord. The piano key which is added to create the music vocabulary of a major 7th chord is located one piano key to the left of 1st piano key in the chord. The music vocabulary template of the structural form of a major 7th chord provides the student with a visual diagram of the interval distance between a group of 4 piano keys which, in the present invention, defines this music vocabulary. Using the Music Vocabulary template, the structural form of a major 7th chord may then be formed by the student from any location on the piano keyboard (see FIG. 14).

Figure 15:
FIG. 15: Music Vocabulary template of a dominant 7th chord.

The music vocabulary referred to as the dominant 7th chord adds the piano key located two piano keys to the left of the 1st piano key of a major chord. In the present invention, the structural form of music vocabulary is defined by the physical distance between each piano key in the selected group of piano keys. Music vocabulary templates provide the student with access to a visual diagram of the piano keyboard utilized as a black and white "blueprint" representing the structural form (interval distance between the selected group of piano keys) used to define the sub-category classifications of multiple forms of music vocabulary. The structural form of the music vocabulary remains the same from any physical location on the piano keyboard (see FIG. 15).

The selected groups of piano keys which form the different classifications of music vocabulary can be performed in various orders and patterns of rhythm across the entire piano keyboard. The motion templates include multiple variations of possibilities from which the student may choose to perform music vocabulary. The musical tones of the music vocabulary, however, remain the same unless otherwise directed.

Figure 16:
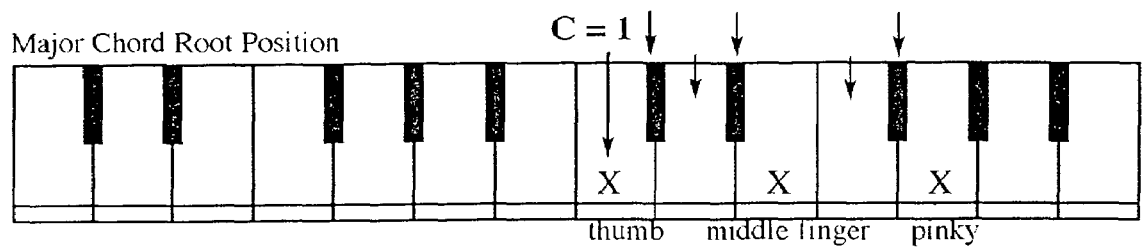
FIG. 16: Motion template: Right Hand: Major chord inversions.
Figure 16:
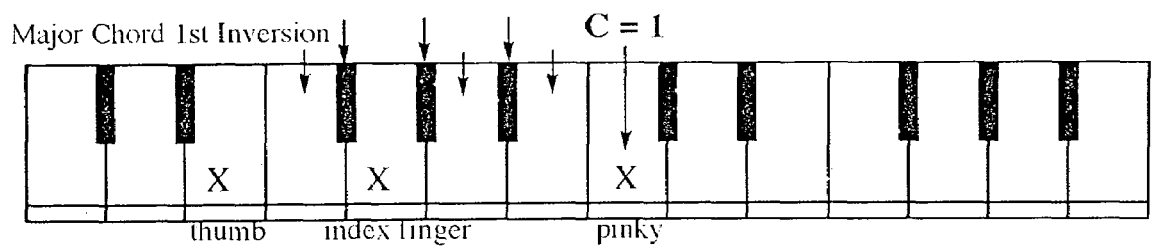
Figure 16:
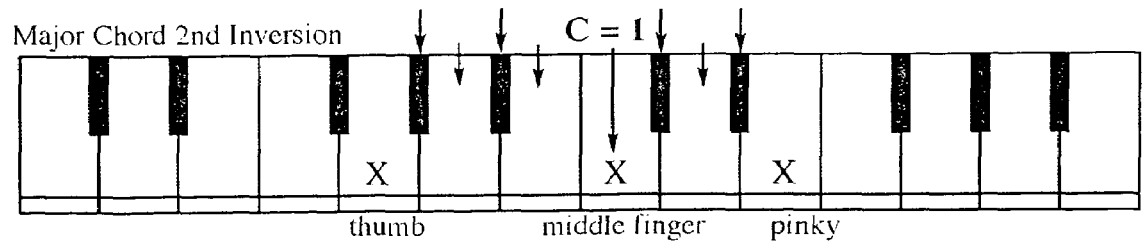

Motion templates include a structural form template designated for the right hand. The student may choose different position of the right hand to perform music vocabulary by rearranging the order of the piano keys played with the right hand. The template provides a single structural form of each possible position of the right hand, referred to as a chord "inversion". Each structural form of music vocabulary has a single template relating to the different positions of the right hand the student may choose from. The number of possible positions is dependent upon the number of piano keys in the structural form of the music vocabulary. For example, the music vocabulary referred to as a "major" chord contains three musical tones with a defined interval distance between three piano keys. In the "root" position, the thumb of the right hand is placed on the physical location of the first piano key of the chord designated by a single alphabetic or numeric symbol. Moving from left to right, the middle finger skips three piano keys to play the middle tone of the chord, and the pinky skips two piano keys from the middle tone of the chord to play the third tone of the chord. The structural form of all major chords in the "root" position remains the same, regardless of the physical location of the music vocabulary on the piano keyboard designated by the numeric or alphabetic symbol (see FIG. 16).

The second position of the right hand used to express the music vocabulary of a major chord in the chord inversion template is referred to as the "1st inversion" position of the chord. In this order, the pinky of the right hand is placed on the physical location of the first piano key of the chord designated by a single alphabetic or numeric symbol. Moving from right to left, the index finger skips four piano keys from the first piano key of the chord to play the third tone of the chord, and the thumb skips two piano keys to the left of the index finger to play the middle tone of the chord. The structural form of all major chords in the "1st inversion" position remains the same, regardless of the physical location of the music vocabulary on the piano keyboard. The physical location of the music vocabulary on the piano keyboard is designated by a single alphabetic or numeric symbol (see FIG. 16).

The third position of the right hand used to express the music vocabulary of a major chord in the chord inversion template is referred to as the "2nd inversion" position of the chord. In this order, the middle finger of the right hand is placed on the physical location of the first piano key of the chord designated by a single alphabetic or numeric symbol. Moving from left to right, the pinky skips three piano keys from the first piano key of the chord to play the middle tone of the chord, and moving from right to left, the thumb skips four piano keys from the middle finger to play the third tone of the chord. The structural form of all major chords in the "2nd inversion" position remains the same, regardless of the physical location of the music vocabulary on the piano keyboard. The physical location of the music vocabulary on the piano keyboard is designated by a single alphabetic or numeric symbol (see FIG. 16).

Figure 17:
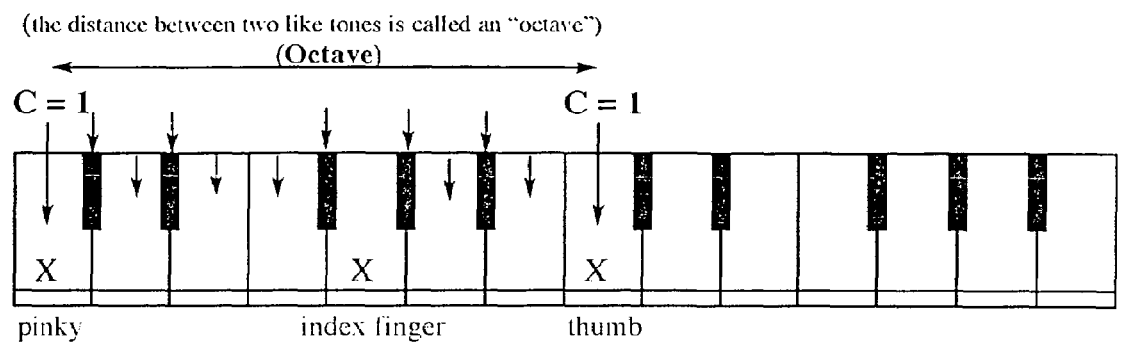
FIG. 17: Motion template: Left hand: The Basic Stretch.

Motion templates provide the student with various hand movements used to express music vocabulary. The motion templates are designed for both the left hand and the right hand. For example, a simple form of expression of basic music vocabulary designed for the left hand is referred to as the "basic stretch". The basic stretch is a pattern of performance of music vocabulary used in many famous compositions to express basic music vocabulary. The pinky of the left hand is placed on the physical location of the piano key designated by the numeric or alphabetic symbol. Moving from left to right, the index finger skips six piano keys to play the 3rd piano key of the chord, and the thumb skips four piano keys from the index finger to play the 1st piano key of the chord an "octave" higher. The basic stretch may be played one piano key at a time moving from left to right, one piano key at a time moving from right to left, or playing all three piano keys simultaneously in various patterns of rhythm (see FIG. 17).

Figure 17B:
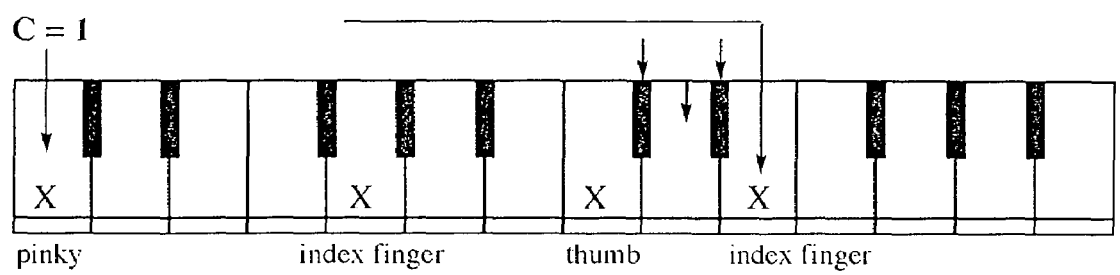
FIG. 17b: Motion template: Left hand: Pattern built from the foundation of the basic stretch.

The basic stretch is often used as the foundation of a more intricate musical phrase expressing basic music vocabulary. For example, a pattern of performance expressing simple music vocabulary designed for the left hand instructs the student to play the basic stretch one piano key at a time moving from left to right, then cross the index finger over the thumb skipping three piano keys to add a fourth tone (the middle tone of the music chord) to the music phrase. Notice that the only piano keys played in the entire musical phrase are components of the structural form of the chord as defined in the present invention. The pattern of motion remains the same from any physical location on the piano keyboard (see FIG. 17b).

The Motion templates used to express simple music vocabulary can be combined in multiple ways. The order of the musical tones of the music vocabulary played are indicated to the student by the motion template. The structural form of the music vocabulary, that is, which piano keys are pressed down by the movement of the hand combining the selected tones of the music vocabulary into comprehensive musical phrases, is conveyed to the student by a single numeric designation.

Figure 18:
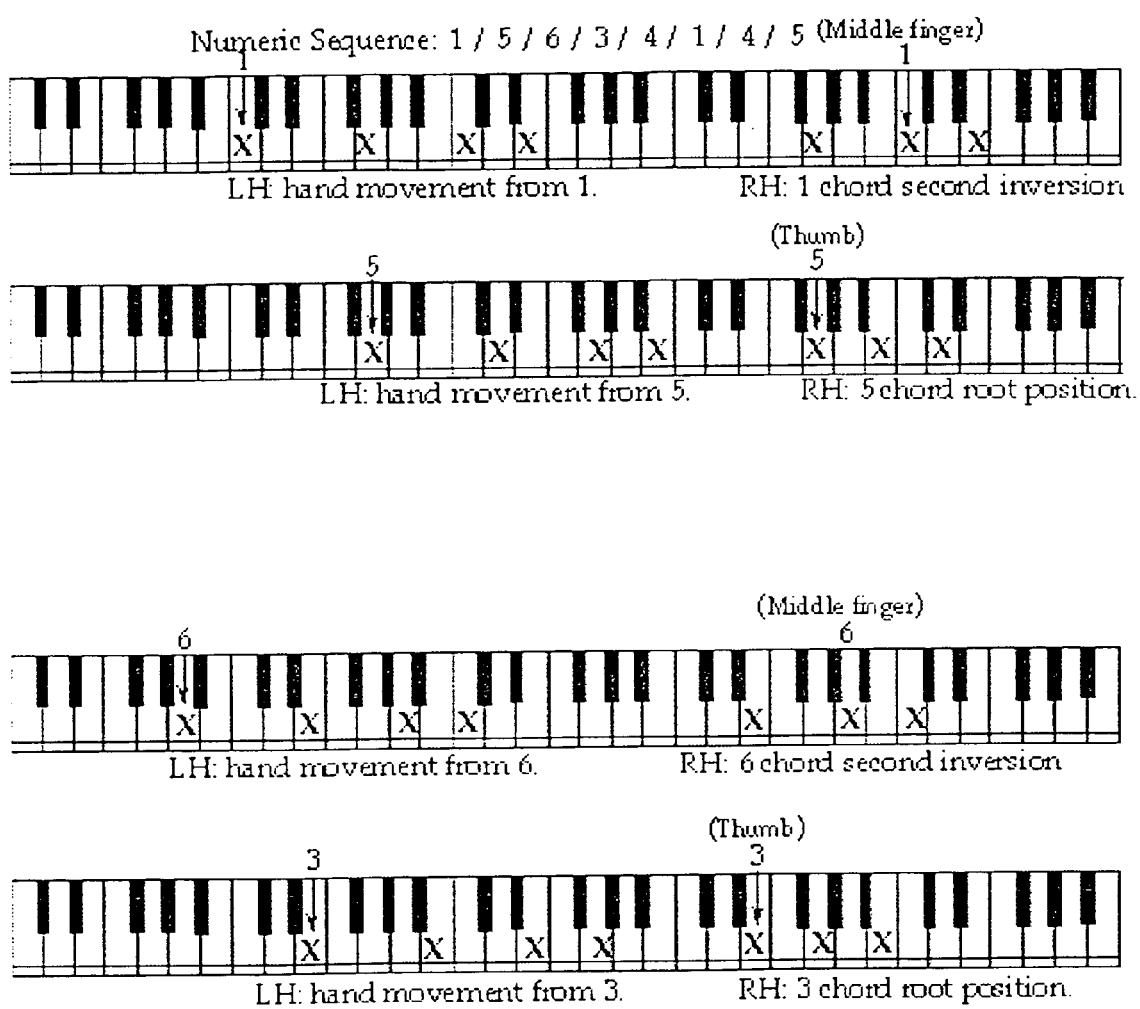
FIG. 18: Musical Performance template.
Figure 18:
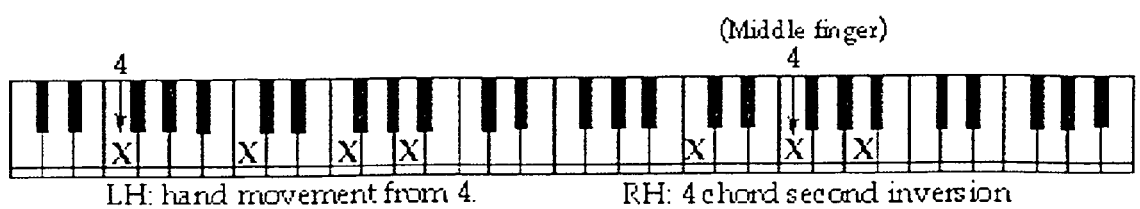
Figure 18:
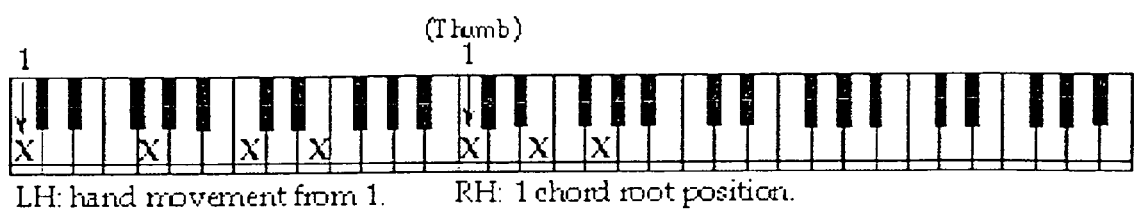
Figure 18:
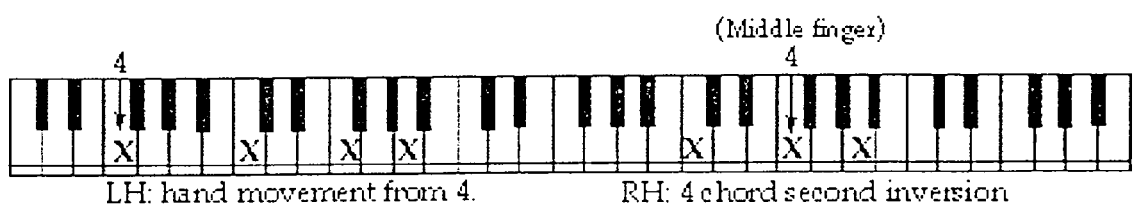
Figure 18:
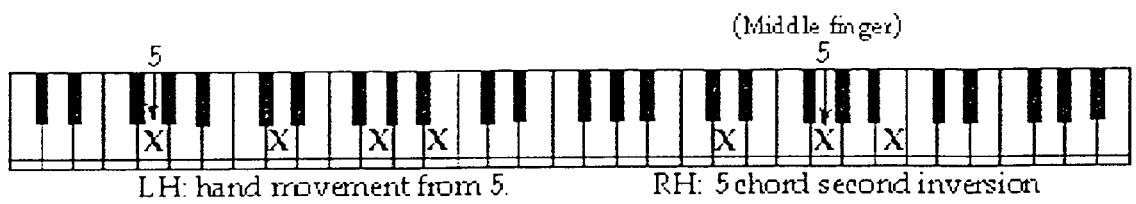

An advanced performance of the structural form of the famous music composition "Pachaelbel's Canon" would be represented to the student of the Numeric Language of Music in the following way. The numeric sequence of the music vocabulary used as the structural form of this very famous music composition is 1/5/6/3/4/1/4/5. The student is instructed to combine the left hand Motion template in FIG. 17b with the right hand's performance of the three tones of each chord in various inversions. The student is instructed to use the motion templates instructing the student to play the three musical tones of the music vocabulary simultaneously. Both hands begin the performance of the music vocabulary at the same time. The right hand holds the three tones of the chord down as the left hand performs the music phrase. The numeric sequence presents the student with a progression of single numeric designations providing the student with the physical location (which piano key) where the motion of the hand begins. The single numeric designations simultaneously provide the student with the structural form of the music vocabulary (which piano keys) to be played by the hand movement. This information provides the student with a single, constant form, referred to as a musical performance template, which may be transposed (moved to a different location on the piano keyboard) to any musical "key" (see FIG. 18).

Similar to the way in which simple and complex word vocabulary are combined in various ways to create specific styles of English literature, such as romance novels, mystery books, etc., music vocabulary' templates are combined in various ways to create different styles and forms of music. For example, in the present invention, a motion template example of the performance of the music vocabulary in a specified pattern of rhythm which classifies a music composition as a "waltz" may be combined with different music vocabulary templates. If the motion template of a waltz is combined with the music vocabulary template used to compose "country" music, the student learns the structural form of a "country waltz". If the motion template of a waltz is combined with the music vocabulary template used to compose "jazz", the student learns the structural form of a "jazz waltz".

Using a keyboard synthesizer with a multi-timbral sound library and a simple multi-track recording devise, the student is instructed to assign the library sound which will be generated by the student's performance on the keyboard, to different instruments of the orchestra. A chart representing the tonal range capacity of the different instruments of the orchestra in relation to the black and white diagram of piano keys is provided to the student. This informs the student of the physical location on the piano keyboard which represents the individual musical instruments available tonal range.

A numeric sequence template representing the structural form of a famous music composition is selected. For example, the numeric sequence template of the structural form of "Pachealbel's Canon" is 1/5/6/3/4/1/4/5. The student is instructed to allocate the cello as the library sound of the 1st track. The student is instructed to record a performance of the numeric designation as a single tone in the register of the keyboard where the cello is most naturally assigned. Next, the student is instructed to allocate the violin as the library sound of the second track. The student begins the second track recording repeating the performance of the three tones of each chord of the music vocabulary designated by the numeric sequence in the register of the keyboard where the violin is most naturally assigned. Playing back the recording, the three tones of the music vocabulary are heard as played by three individual violins. Next, the student is instructed to allocate the flute as the library sound of the third track. The student begins recording repeating the performance of the numeric sequence as single tones in the upper register (portion of the keyboard) where the flute would normally be assigned. Playing back the full recording, the student hears how the structural form of music vocabulary sounds when performed by different instruments of the orchestra. The student begins to learn how to assign different instruments to the performance of different parts of the music templates of vocabulary and motion. The music templates of the vocabulary of the language of music as defined by the present invention remain a single, constant form, in every key, which may be assigned to be performed by any combination of musical instruments used in the orchestrated performance of the twelve-tone system of Western music.

The written symbols of music literature are presented to the student as representing the previous information.

The indicia used in the present invention can be memorialized via hand-writing, printing, or storage in electronic or electromagnetic media, such as a programmable computer, CD device, DVD device, magnetic tape, magnetic disk, or via any means now known in the art or developed in the future for fixing indicia in a tangible medium of expression.

What is claimed is:

1. A method of conveying musical information, the method comprising:
   (a) designating a numeric value of vibrations per second (vps) for each pitch of a first group of pitches in an even-tempered, Western-style, twelve-tone group of musical pitches; wherein each numeric value is a fixed identity of its corresponding pitch;
   (b) designating a corresponding number of vibrations per second in recurring groups of twelve pitches in the even-tempered, Western-style, twelve-tone group of musical pitches, wherein in each recurring group, the number of vibrations per second per pitch is integrally proportional or integrally inversely proportional to the corresponding vibrations per second in the first group of pitches;
   (c) designating white and black keys of a piano keyboard as a visual diagram representing the pitches designated by steps (a) and (b);
   (d) designating tonal relationships utilized in composing music in the even-tempered, twelve-tone system of Western music as music vocabulary;
   (e) defining the music vocabulary of step (d) as structural forms represented by a fixed interval distance between each piano key in a selected group of piano keys, which distance remains identical from any designated location on the piano keyboard;
   (f) assigning seven sequential numeric designations, 1, 2, 3, 4, 5, 6 and 7, as a system of reference to the physical location of a corresponding selected group of seven piano keys on the piano keyboard, wherein the sequential numeric designations correspond to a defined physical distance and interval relationship between each piano key in the selected group of seven piano keys, and also correspond to the first group of pitches of step (a);
   (g) designating keyboard diagrams of structural forms of hand movements as motion templates visually representing defined motions of a player's hands to perform music vocabulary templates in pre-set tonal orders and patterns of rhythm, the motion templates providing a structural form of hand movements which remain identical from any physical location on the piano keyboard, wherein the physical location of the motion template on the piano keyboard is designated by a single numeric symbol;
   (h) modeling a musical passage by compiling a pattern of printed or electronically-stored indicia of one or more numeric designations selected from the group consisting of the numeric designations of step (g) and then
   (i) providing the model of step (h) to a student via visual or auditory means.

2. The method of claim 1, wherein step (h) comprises modeling the musical passage by compiling a pattern of printed numeric indicia.

3. The method of claim 1, wherein step (h) comprises modeling the musical passage by compiling a pattern of electronically-stored numeric indicia.

4. A method of conveying musical information, the method comprising:
   (a) designating a numeric value of vibrations per second (vps) for each pitch of a first group of pitches in an even-tempered, Western-style, twelve-tone group of musical pitches; wherein each numeric value is a fixed identity of its corresponding pitch;
   (b) designating a corresponding number of vibrations per second in recurring groups of twelve pitches in the even-tempered, Western-style, twelve-tone group of musical pitches, wherein in each recurring group, the number of vibrations per second per pitch is integrally proportional or integrally inversely proportional to the corresponding vibrations per second in the first group of pitches;
   (c) designating white and black keys of a piano keyboard as a visual diagram representing the pitches designated by steps (a) and (b);
   (d) designating tonal relationships utilized in composing music in the even-tempered, twelve-tone system of Western music as music vocabulary;
   (e) defining the music vocabulary of step (d) as structural forms represented by a fixed interval distance between each piano key in a selected group of piano keys, which distance remains identical from any designated location on the piano keyboard;
   (g) designating keyboard diagrams visually representing physical distance between each piano key of a selected group of piano keys as music vocabulary templates used to define a structural form of tonal relationships of the music vocabulary of step (d);
   (h) assigning seven sequential numeric designations, 1, 2, 3, 4, 5, 6 and 7, as a system of reference to the physical location of a corresponding selected group of seven piano keys on the piano keyboard, wherein the sequential numeric designations correspond to a defined physical distance and interval relationship between each piano key in the selected group of seven piano keys, and also correspond to the first group of pitches of step (a);

(i) designating keyboard diagrams of structural forms of hand movements as motion templates visually representing defined motions of a player's hands to perform music vocabulary templates in pre-set tonal orders and patterns of rhythm, the motion templates providing a structural form of hand movements which remain identical from any physical location on the piano keyboard, wherein the physical location of the motion template on the piano keyboard is designated by a single numeric symbol;

(j) modeling a musical passage by compiling a pattern of printed or electronically-stored indicia of one or more numeric designations selected from the group consisting of the numeric designations of step (h) and then (k) providing the model of step (j) to a student via visual or auditory means.

5. The method of claim 4, wherein step (j) comprises modeling the musical passage by compiling a pattern of printed numeric indicia.

6. The method of claim 4, wherein step (j) comprises modeling the musical passage by compiling a pattern of electronically-stored numeric indicia.

7. A method of conveying musical information, the method comprising:

(a) designating a numeric value of vibrations per second (vps) for each pitch of a first group of pitches in an even-tempered, Western-style, twelve-tone group of musical pitches; wherein each numeric value is a fixed identity of its corresponding pitch;

(b) designating a corresponding number of vibrations per second in recurring groups of twelve pitches in the even-tempered, Western-style, twelve-tone group of musical pitches, wherein in each recurring group, the number of vibrations per second per pitch is integrally proportional or integrally inversely proportional to the corresponding vibrations per second in the first group of pitches; and wherein each numeric value is a fixed identity of its corresponding pitch;

(c) designating white and black keys of a piano keyboard as a visual diagram representing the pitches designated by steps (a) and (b);

(d) assigning seven sequential alphabetic symbols, A, B, C, D, E, F and G as an independent system of reference to physical locations of seven contiguous white keys in a structural form of each recurring group of twelve piano keys, wherein the alphabetic symbol C is assigned to a white key located left of a group of two black keys on the piano keyboard;

(e) designating the alphabetic symbol as a single point of reference to the physical locations of a piano key from which a defined interval relationship between a selected group of piano keys is formed; wherein the piano keys are a visual diagram representing the pitches designated by steps (a) and (b);

(f) assigning seven sequential numeric designations, 1, 2, 3, 4, 5, 6 and 7, as a system of reference to the physical location of a corresponding selected group of seven piano keys on the piano keyboard, wherein the sequential numeric designations correspond to a defined physical distance and interval relationship between each piano key in the selected group of seven piano keys, and wherein the physical location of the piano keys also correspond to the group of pitches of step (a) and (b);

(g) designating the numeric symbols as a single point of reference to the physical location of a piano key from which a defined physical distance and interval relationship between a selected group of piano keys is formed, the piano keys also corresponding to the pitches of step (a) and (b);

(h) designating tonal relationships utilized in composing music in the even-tempered, twelve-tone system of Western music as music vocabulary;

(i) defining the music vocabulary of step (h) as structural forms represented by a fixed interval distance between each piano key in a selected group of piano keys, which distance remains identical from any designated location on the piano keyboard, the designated location represented by a single alphabetic or numeric symbol; wherein the physical location of the piano keys also correspond to the pitches of step (a) and (b);

(j) defining keyboard diagrams corresponding to the music vocabulary of step (i) as music vocabulary templates;

(k) assigning the structural forms of step (i) to selected groups of three piano keys corresponding to the sequential numeric designations 1, 2, 3, 4, 5, 6 and 7 of step (f), as seven primary chords, wherein each numeric designation uniquely denotes a group of three piano keys with an interval relationship as follows; primary chords 1, 4 and 5 designate a group of three piano keys where the physical location of the first piano key of the group of three piano keys is identified by the numeric designation 1, 4 or 5, the second piano key in the group of three piano keys is located four piano keys to the right of the numeric designation of the chord, and the third piano key in the group of three piano keys is located three piano keys to the right of the second piano key of the chord; primary chords 2, 3 and 6 designate a group of three piano keys where the physical location of the first piano key of the group of three piano keys is identified by the numeric designation 2, 3 or 6, the second piano key in the group of three piano keys is located three piano keys to the right of the numeric designation of the chord, and the third piano key in the group of three piano keys is located four piano keys to the right of the second piano key of the chord; and primary chord 7 designates a group of three piano keys where the physical location of the first piano key of the group of three piano keys is identified by the numeric designation 7, the second piano key in the group of three piano keys is located two piano keys to the right of the numeric designation of the chord, and the third piano key in the group of three piano keys is located two piano keys to the right of the second piano key of the chord; and wherein the piano keys of the chord also correspond to the group of pitches of step (a) and (b);

(l) designating keyboard diagrams of structural forms of hand movements as motion templates visually representing defined motions of a player's hands to perform music vocabulary templates in pre-set tonal orders and patterns of rhythm, the motion templates providing a structural form of hand movements which remain identical from any physical location on the piano keyboard, wherein the physical location of the motion template on the piano keyboard is designated by a single numeric symbol;

(m) modeling a musical passage by compiling a pattern of printed or electronically-stored indicia of one or more numeric designations selected from the group consisting of the numeric designations of step (f) and (n) providing the model of step (m) to a student via visual or auditory means.

8. The method of claim 7, wherein the alphabetic symbols of step (d) do not represent the fixed identity of a corresponding musical pitch.

9. The method of claim 8, wherein the alphabetic symbols of step (d) are not combined to symbolically represent structural relationship between a selected group of musical pitches.

10. The method of claim 7, wherein the numeric symbols of step (k) are not combined to symbolically represent the structural relationship between the selected group of musical pitches.

11. The method of claim 7, wherein step (m) comprises modeling the musical passage by compiling a pattern of printed numeric indicia.

12. The method of claim 7, wherein step (m) comprises modeling the musical passage by compiling a pattern of electronically-stored numeric indicia.

* * * * *